A. E. SCHATZ.

Devices for Fastening Clothes-Lines.

No. 136,768. Patented March 11, 1873.

UNITED STATES PATENT OFFICE.

ADAM E. SCHATZ, OF NEW YORK, N. Y.

IMPROVEMENT IN DEVICES FOR FASTENING CLOTHES-LINES, &c.

Specification forming part of Letters Patent No. 136,768, dated March 11, 1873.

*To all whom it may concern:*

Be it known that I, ADAM E. SCHATZ, of the city, county, and State of New York, have invented a Device for Fastening Clothes-Lines and other Cords or Ropes, of which the following is a specification:

This invention, though very useful for fastening any lines, is principally designed for use on those exposed to changes of weather, and is intended to facilitate the taking up of slack when there is any, and the letting out of the line when desirable to avoid undue strain on it. The device consists of a body-piece furnished with two eyes, one above the other, and at the other end with two jaws, having pivoted between them a dog or clamping piece. One end of the line is fastened to the lower of the two eyes, and the other end is passed between the aforesaid dog and the body-piece and passed through the upper eye, and when the dog has been adjusted the greater the pull on the line the firmer it is clamped.

Figure 1:
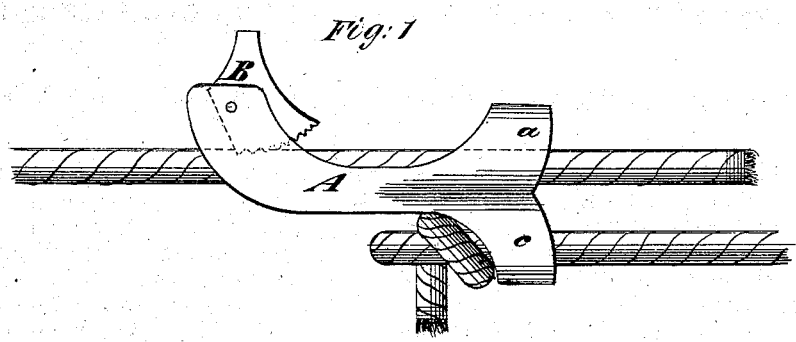
Figure 2:
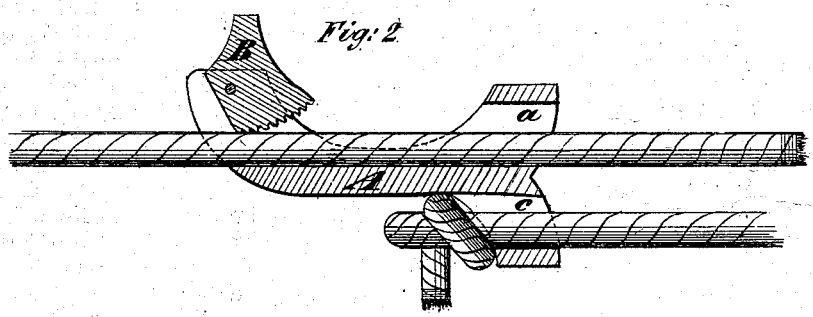

In the accompanying drawing, Figure 1 is a side view of a line-fastener made according to my invention, and Fig. 2 is a longitudinal section of the same.

Similar letters of reference indicate corresponding parts in both figures.

A is the body-piece of the device. It has formed on it at one end two eyes, *a* and *c*, in close proximity to each other. At the opposite end the body is formed to constitute two jaws or bearings, between which a dog or clamping-piece, B, is pivoted. These jaws project up from the same side of the piece A as the eye *a* does, and the dog, which has an arc-shaped face, is pivoted eccentrically, so that the further it is drawn forward by the tension of the line the harder it will bite on the line, and the more firmly the latter will be held. The face is serrated the better to prevent the line from slipping. The dog is furnished above its pivot with a thumb-piece by which it may be manipulated.

This fastener is not only applicable to clothes-lines, but is very useful aboard ship for fastening lines of all sorts. It is applied to a line as follows: One end is passed through the eye *c* and knotted; the other is passed between the dog and the body-piece and thence through the eye *a*. The dog is adjusted in position to bite on the line, and then the greater the tension on the line the further forward the most extended portion of the dog will be drawn, and therefore the harder will it bite on the line. When the line is slackened by reason of a change in the weather or other cause, the slack may be taken up by simply pulling the line further through the body-piece.

Claim.

A line-holder composed of a body, A, of the construction herein described, and a serrated dog or cam-holder, B, combined and arranged substantially as and for the purpose herein set forth.

ADAM E. SCHATZ.

Witnesses:
 EDWIN H. BROWN,
 MICHAEL RYAN.